United States Patent
Bühler

(10) Patent No.: US 6,776,597 B2
(45) Date of Patent: Aug. 17, 2004

(54) TOOL FOR MULTI-COMPONENT INJECTION MOLDING OF PLASTIC TOOTHBRUSH BODIES OF TOOTHBRUSHES

(75) Inventor: Klaus Bühler, Bahlingen (DE)

(73) Assignee: Braun Formenbau GmbH, Bahlingen (DE)

( * ) Notice: Subject to any disclaimer, the term of this patent is extended or adjusted under 35 U.S.C. 154(b) by 88 days.

(21) Appl. No.: 09/995,408

(22) Filed: Nov. 27, 2001

(65) Prior Publication Data

US 2002/0136790 A1 Sep. 26, 2002

(51) Int. Cl.[7] ............................................. B29C 45/16
(52) U.S. Cl. ....................... 425/116; 425/127; 425/130; 425/572
(58) Field of Search ................................ 425/572, 112, 425/116, 117, 127, 130, 573, 574

(56) References Cited

U.S. PATENT DOCUMENTS

| | | | | |
|---|---|---|---|---|
| 5,256,048 A | * | 10/1993 | Jacobs et al. | 425/130 |
| 5,609,890 A | * | 3/1997 | Boucherie | 425/130 |
| 5,761,759 A | * | 6/1998 | Leversby et al. | 425/573 |
| 6,379,139 B1 | * | 4/2002 | Boucherie | 425/574 |

FOREIGN PATENT DOCUMENTS

| | | |
|---|---|---|
| DE | 41 27 621 | 2/1993 |
| DE | 44 17 986 | 11/1995 |
| DE | 44 39 431 | 5/1996 |
| DE | 195 42 102 | 5/1997 |
| DE | 197 22 366 | 12/1998 |
| EP | 0 504 571 | 1/1996 |
| EP | 0 836 923 | 4/1998 |

OTHER PUBLICATIONS

Patent Abstracts of Japan, vol. 1, No. 181, Jun. 25, 1986; Nissei Plastics Ind. Co.

* cited by examiner

Primary Examiner—Tim Heitbrink
(74) Attorney, Agent, or Firm—Gudrun E. Huckett

(57) ABSTRACT

A tool for multi-component injection molding of plastic toothbrush bodies 4 for toothbrushes has two tool halves 1, 1' which can be opened and closed. In one tool half 1 a linearly movable transfer device 6 is arranged. The hollow mold spaces 2 for injection molding the first component are formed exclusively by the two tool halves 1, 1'. For transferring the injection-molded blanks (3) in the second station, the transfer device 6 moves into the area of the injection-molded blanks 3, picks them up by vacuum suction cups 11, and transfers the injection-molded blanks 3 by linear movement into the second station.

13 Claims, 16 Drawing Sheets

Figure 1A:
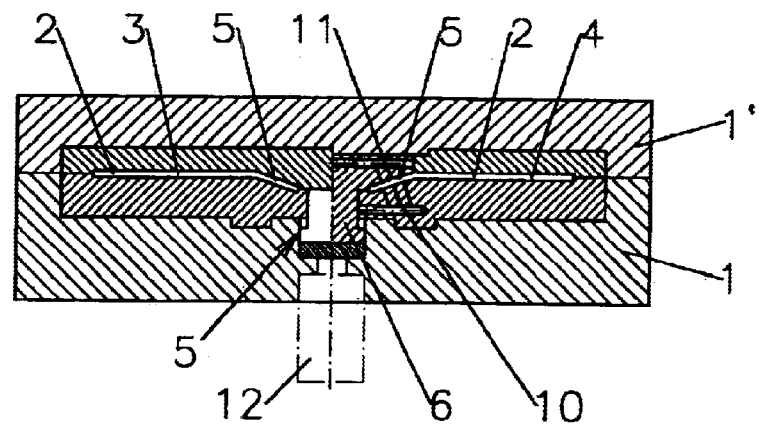
Figure 1A:
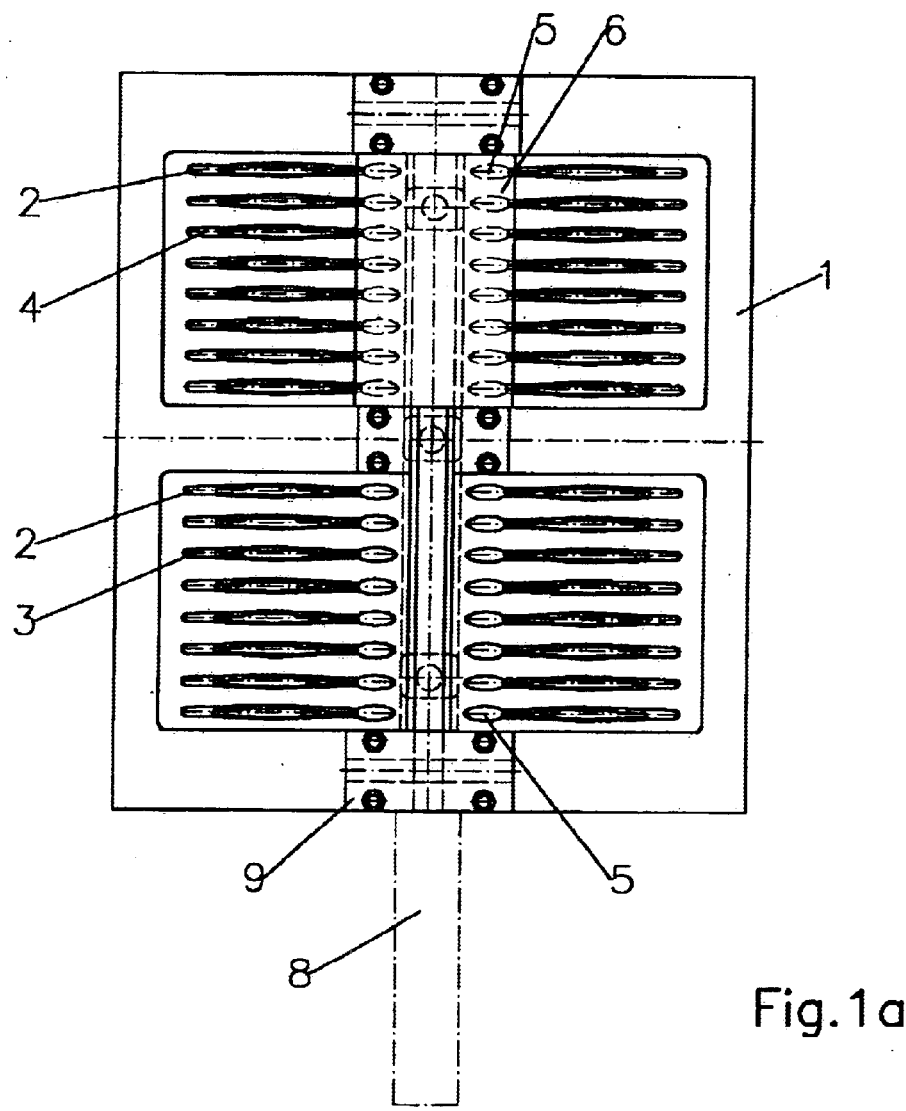

TOOL FOR MULTI-COMPONENT INJECTION MOLDING OF PLASTIC TOOTHBRUSH BODIES OF TOOTHBRUSHES

The invention relates to a tool for multi-component injection molding of plastic toothbrush bodies for toothbrushes according to the preamble of claim 1.

The following is based on the supposition that with the tool not only a single toothbrush body can be injection molded, respectively, but that a tool is concerned with which simultaneously several toothbrush bodies can be injection molded.

For injection molding toothbrush bodies comprised of several plastic components, the initially injection-molded blank must be transferred into a further hollow mold space where further components are injection molded, in particular, in the area of the grip. In order to transfer the injection-molded blank of the first component into the hollow mold space for the second component, so-called turnover tools are known. This is to be understood such that a so-called turnover part is provided within one tool half which, after injection molding of the first component, is rotated by 180° for injection molding of the second component, wherein this turnover part secures the injection-molded blank during the rotational movement.

The disadvantage resides in that this additional transfer device in the form of a turnover part contributes to limiting the hollow mold space for injection-molding of the first component. Inasmuch as the border line is in the area of the head of the toothbrush body to be injection-molded, a projecting burr can be formed there which is particularly undesirable in this head area of the toothbrush body because the person brushing the teeth with such a toothbrush can feel this burr in the mouth and can even be hurt by it in an extreme situation.

Based on this, it is an object of the invention to provide an improved tool for multi-component injection molding of plastic toothbrush bodies for toothbrushes which does not cause burrs in the area of the head of the injection-molded toothbrush body.

The technical solution is characterized by the features of the characterizing portion of claim 1.

The basic idea of the tool according to the invention for multi-component injection molding of plastic toothbrush bodies for toothbrushes resides in that the injection-molded blank comprising the first component is injection molded in a hollow mold space which is formed only by the two tool halves without the turnover device contributing to delimiting the hollow mold space. This prevents that, in particular, in the area of the head of the toothbrush body a circumferential burr results. By forming the hollow mold space for the first component exclusively by means of the two tool halves, this configuration includes that, for example, hole array pins project into the hollow mold space which can be removed again after injection molding of the first component. These hole array pins are considered part of the tool half. A further basic idea of the tool according to the invention resides in that for injection molding of the second component the transfer device essentially "picks up" the injection-molded blank of the first component in that the turnover device is moved into the area of this injection-molded blank in order to pick it up in a suitable way and to transfer it subsequently into the hollow mold space for the second component. This transfer of the basic body into the additional injection molding station represents a technically simple possibility for manufacturing multi-component toothbrush bodies. Since the transfer device receives the injection-molded blank, this transfer device is formed as a cavity.

The further embodiment according to claim 2 suggests that the transfer device is linearly movable. The transfer device can be, for example, a pneumatic cylinder with stop position damping at both ends. With such a transfer device, the injection-molded blanks are transported linearly into the position for injection-molding the second component so that overall the transfer device performs a back and forth movement during an injection-molding cycle.

The further embodiment according to claim 3 suggests cross-section shapes of guides with which a technically simple and primarily reproducible movability of the transfer device is possible. In this connection, running plates can be provided, if desired, which are coupled with the transfer device.

A further preferred embodiment according to claim 4 suggests that the transfer device can be lifted off the correlated tool half. In this way, the injection-molded blanks can be initially removed from their cavities in a vertical transverse direction in order to subsequently transfer them into their position for injection molding the second component where the transfer device is then returned into its immersed position. Inasmuch as for the transfer device a T-shaped or L-shaped guide is provided, the transverse beam of the "T" or the "L" has a corresponding lifting stroke. For lifting the transfer device, a pneumatic short-stroke cylinder for lifting and lowering the transfer device can be provided.

The further embodiment according to claim 5 suggests a method as well as a constructive arrangement in order to first lift the injection-molded blank in an optimal way first from its cavity and then transfer it into the second cavity. The basic idea resides in that the transfer device grips the injection-molded blank from above and thus lifts it out of the cavity wherein the lifting movement can be assisted by tool ejectors in order to provide the necessary force for lifting.

According to a further preferred embodiment of the invention claim 6 suggests that the transfer device receives the head of the injection-molded blank. The advantage resides in that for injection-molding the second component the transfer device can continue to engage the head because generally no further component must be injection molded in this head area. Instead, additional components are injection-molded generally onto the area of the grip of the toothbrush body. However, in the case that the second component is to be injection-molded onto the head, the transfer device will grip the neck (or the grip) instead of the head.

The further embodiment according to claim 7 has the advantage that in a technically simple way the injection-molded blank can be taken from the cavity in that by a suction force pulling the injection-molded blank toward the transfer device, a force is generated which is large enough in order to overcome the securing force of the injection-molded blank in its cavity, wherein in this case moreover the lifting movement can be assisted by tool ejectors in order to provide the required force for lifting.

The further embodiment according to claim 8 is based on the fact that the injection-molded blank is secured for injection molding of the further component by the transfer device and, in this way, the cavity of this transfer device represents a partial cavity of the hollow mold space for injection molding of the second component. However, this only means that the transfer device defines the cavity for receiving the injection-molded blank, but that outside of the area of the transfer device between the injection-molded blank and the two tool halves additional cavities exist into which the second component is injection-molded.

Accordingly, no plastic is injected into the transfer device, i.e., the transfer device will not come into contact with the injection-molded plastic. It is provided only as a negative cavity of the already injection-molded shaped elements.

The further embodiment according to claim 9 provides a possibility by means of which the finish-injection-molded toothbrush body can be secured within its cavity when the transfer device is extended for "picking up" a new injection-molded blank. In this way, the finish-injection-molded product is secured by vacuum in the finish-injection-molding cavity, wherein the vacuum suction cups preferably—also—engage the head of the toothbrush body. Accordingly, the mold insert in the head area can be provided with corresponding vacuum suction cups.

A first variant in the arrangement of the toothbrush body is suggested by the claims 10 and 11. In this arrangement, the heads of the toothbrush body are oriented toward the center because there the transfer device is located and this transfer device engages the injection-molded blank in its head area for the transfer process.

A second variant is suggested according to claim 12, where the toothbrush body is aligned in the transfer direction of the transfer device.

In minimal configuration of the tool, two components can be injection molded. Of course, it is also conceivable to injection-mold the toothbrush bodies with more than two components. In this case, the further embodiment according to claim 13 suggests that several stations for injection-molding of more than two components can be serviced by the transfer device.

Two embodiments of a tool for multi-component injection molding of plastic-toothbrush bodies for toothbrushes are described in the following with the aid of the drawings. It is shown in:

FIGS. 1a to 1h a first embodiment of the tool in a plan view as well as a cross-section illustration, respectively, showing the course of the process steps;

FIGS. 2a to 2h a second embodiment of the tool in a plan view as well as a cross-sectional illustration and a longitudinal section illustration, respectively, showing the course of the process steps.

The tool of the first embodiment according to FIGS. 1a to 1h has two tool halves 1, 1' which can be moved away from one another and toward one another. These tool halves 1, 1' define between them hollow mold spaces 2 for injection-molding initially a first component and subsequently for injection-molding a second component. In this connection, the hollow mold spaces 2 are formed such that the injection-molded blank 3 or the finish-injection-molded toothbrush body 4 are aligned transversely to the longitudinal centerline of the tool and are oriented with their heads 5 toward one another.

In one tool half 1 a linearly slidable transfer device 6 is provided. For this purpose, the tool half 1 has a guide 7 which in cross-section is T-shaped and along which the transfer device 6 can be moved by means of a pneumatic cylinder 8 with stop position damping at both ends wherein the tool half 1 is provided at the ends with a fixed stop 9, respectively.

In the area of the heads 5 the hollow mold spaces 2, which are correlated with the finish-injection-molded toothbrush bodies 4, have vacuum suction cups 10. The transfer device 6 has also vacuum suction cups 11.

The function of the tool for the two component injection-molding of toothbrush bodies 4 is to be explained in the following by means of the course of the process illustrated in FIGS. 1a to 1h.

In FIG. 1a the initial position is illustrated. In the lower area there are hollow mold spaces 2 for the injection-molded blanks 3 and in the upper area for the finish-molded products, i.e., the already finished toothbrush bodies 4. This is to be the result of a preceding injection molding cycle.

Figure 1B:
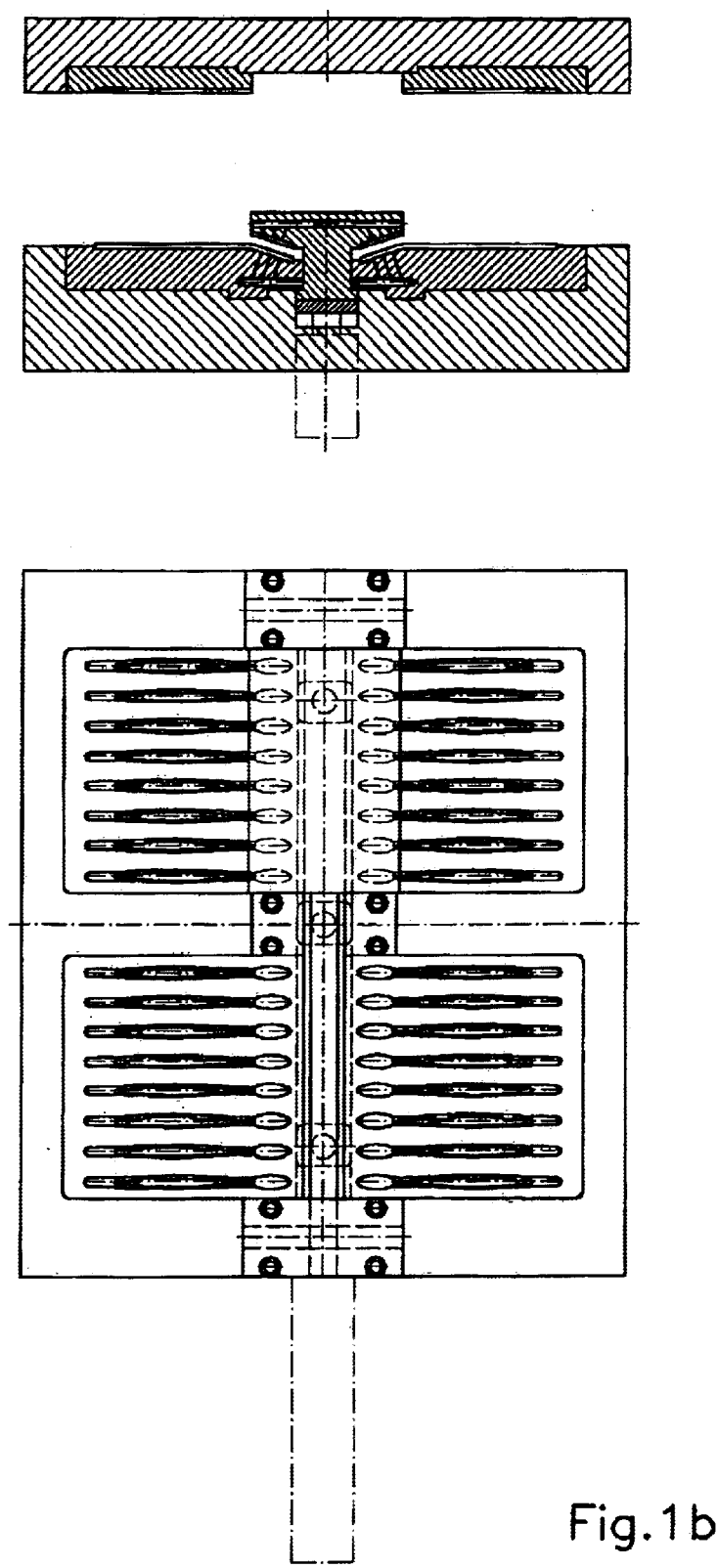

At the beginning of a new cycle, in FIG. 1b the two tools halves 1, 1' are moved apart and the tool is opened in this way. The transfer device 6 is positioned—still—in the area of the toothbrush bodies 4, i.e., at the top in the (lower) drawing. The transfer device 6 is then extended by means of a pneumatic short-stroke cylinder 12 according to the stroke along the T-shaped guide 7. The toothbrush bodies 4 are secured by actuation of the vacuum suction cups 10.

Figure 1C:
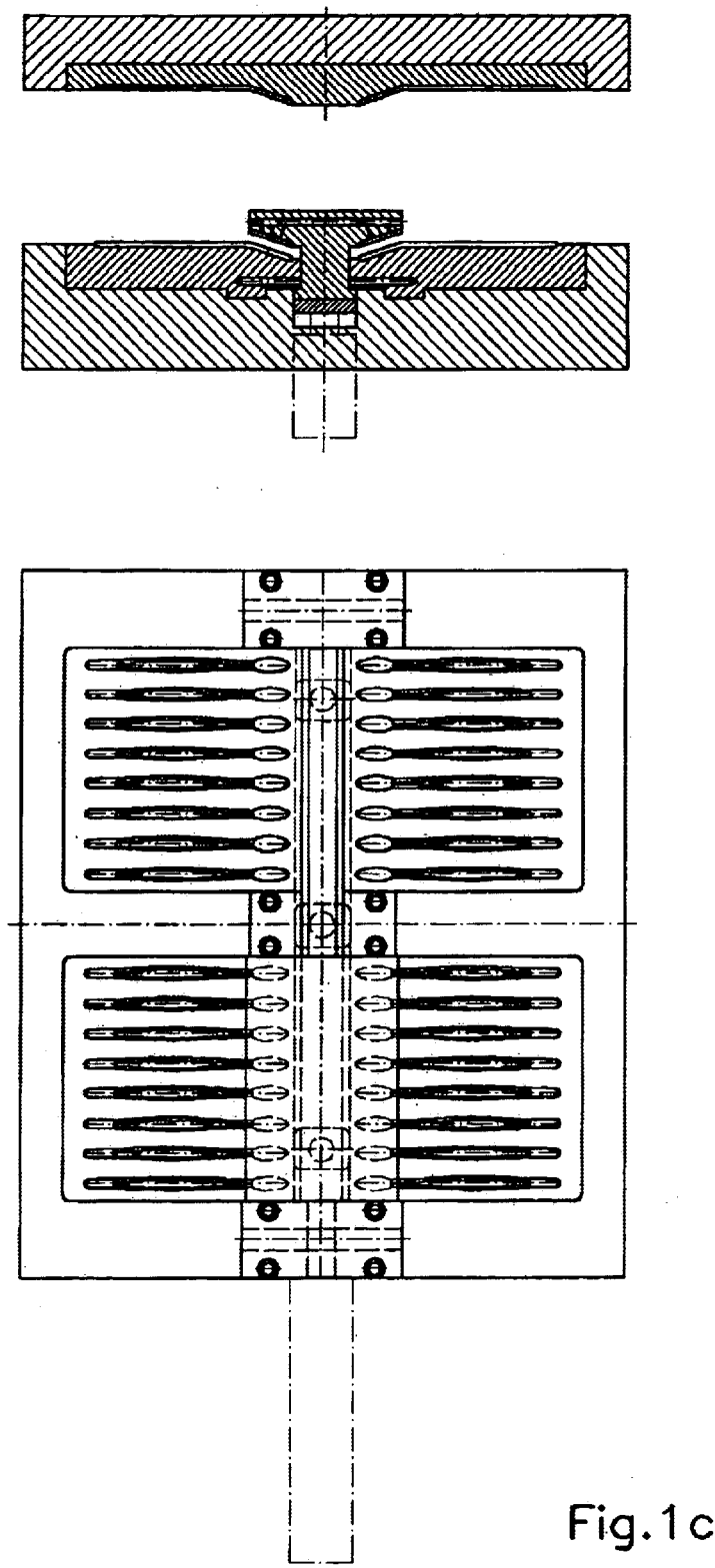

In the next method step according to FIG. 1c, the transfer device 6 is moved by means of the pneumatic cylinder 8 into the position of the injection-molded blanks 3, i.e., downwardly in the (lower) drawing. Parallel to this, the finish-injection-molded toothbrush bodies 4 can be removed by external handling.

Figure 1D:
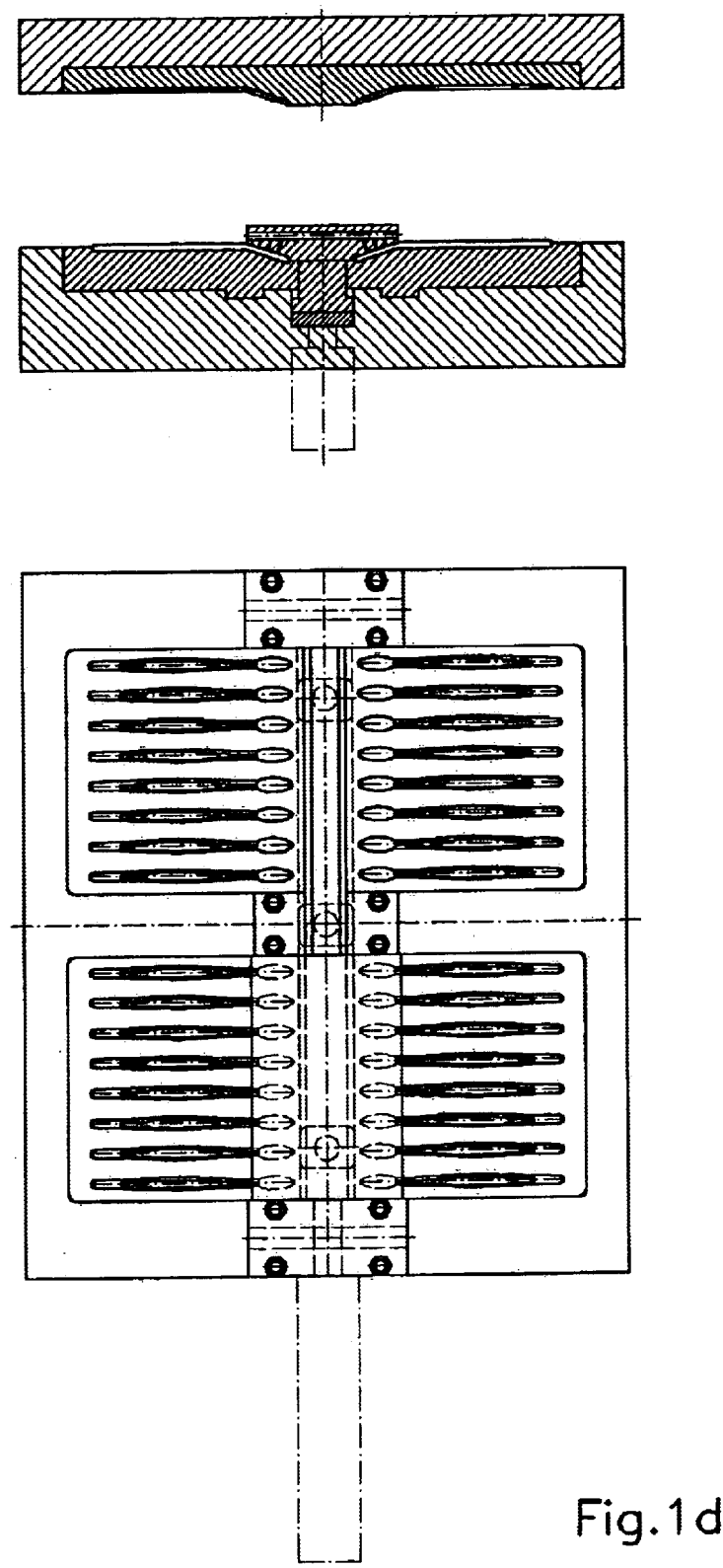

In the further method step according to FIG. 1d, the transfer device 6 is lowered within the blank-molding station. The injection-molded blanks 3 positioned therein are picked up by means of the vacuum suction cups 11. The hole array pins—not illustrated —in the area of the later bristle array of the toothbrush body 4 are hydraulically removed.

Figure 1E:
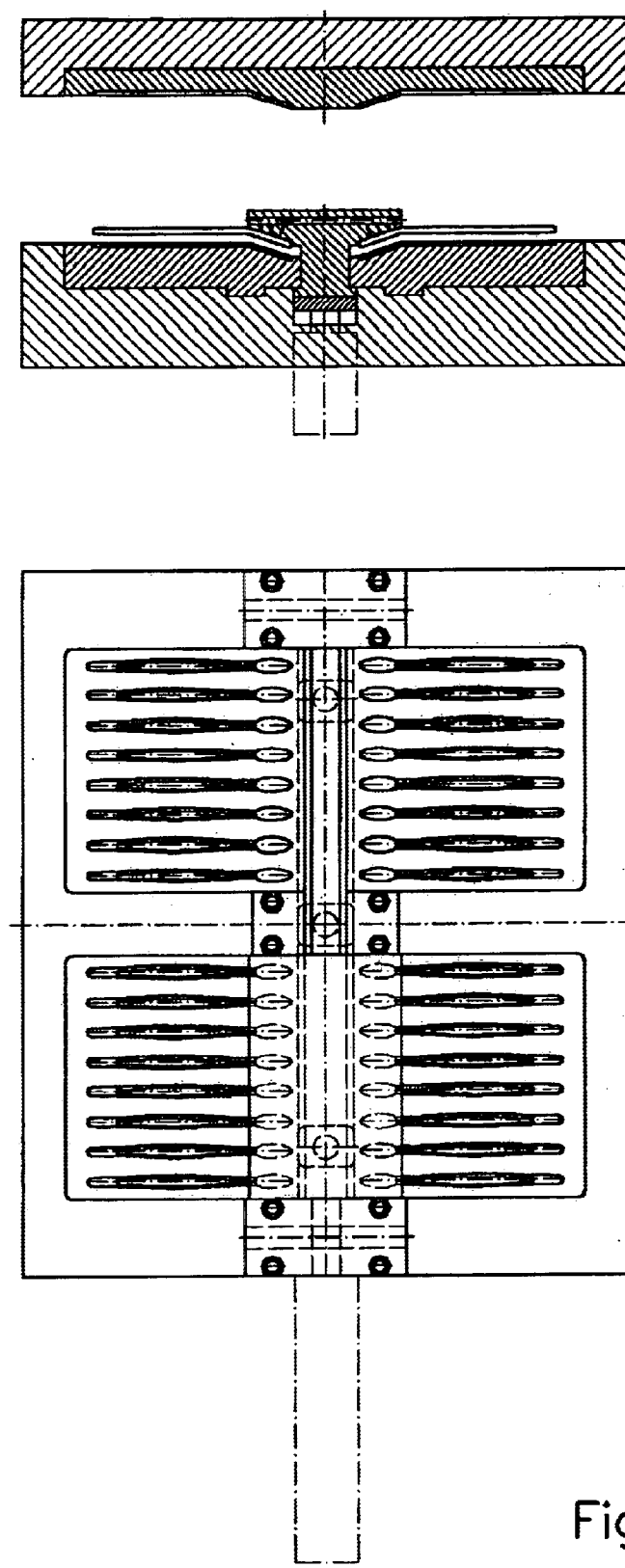

Subsequently, according to FIG. 1e, the injection-molded blanks 3 are removed from their hollow mold spaces 2 in that the transfer device 6, by means of the pneumatic short stroke cylinder 2, is again extended. In this connection, an additional ejection assistance can be provided because of the forces required for release of the injection-molded blanks 3 from their hollow mold spaces 2.

Figure 1F:
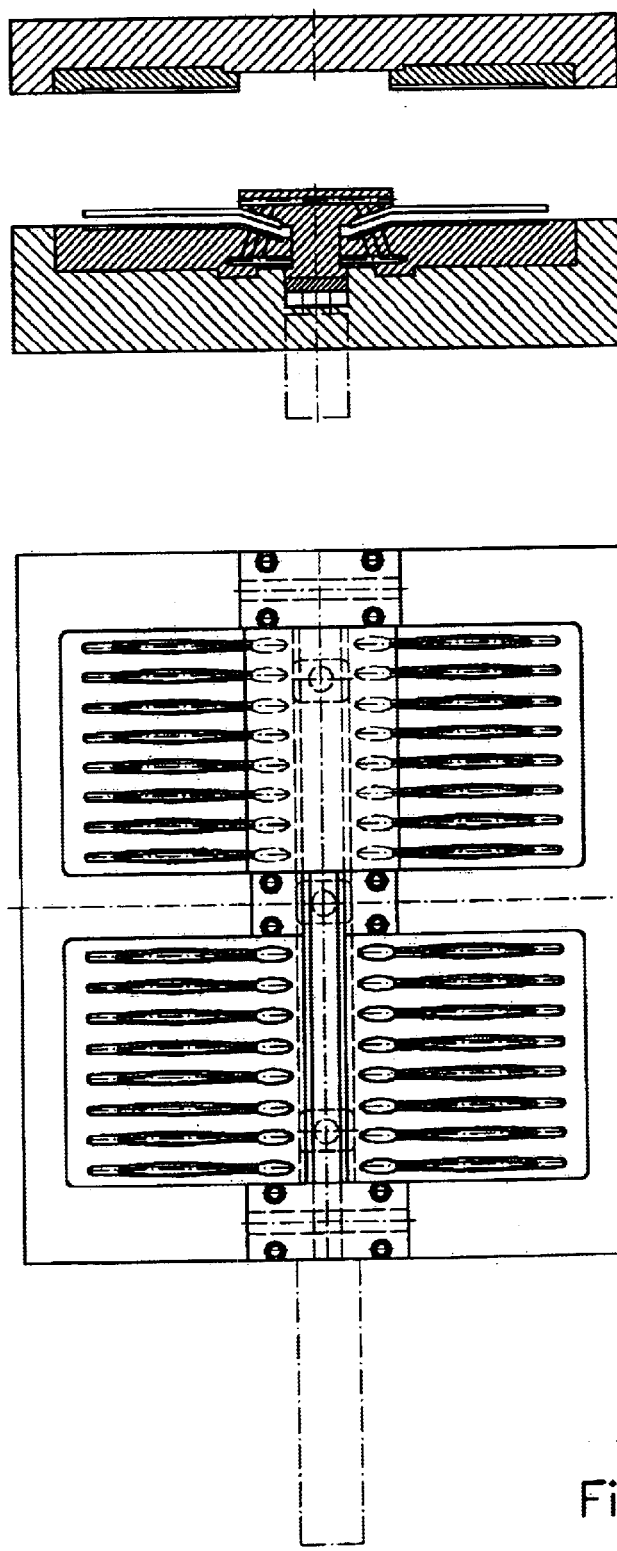
Figure 1G:
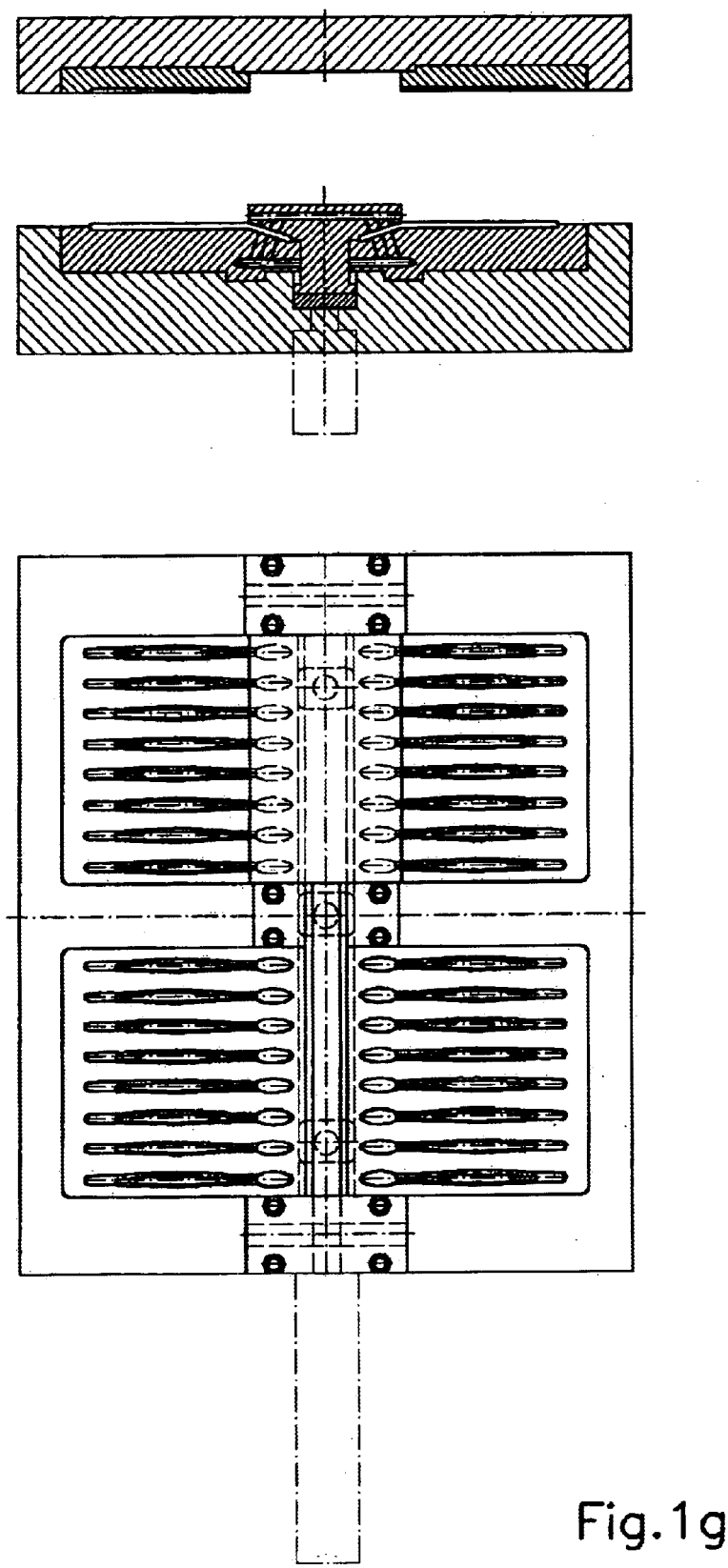

In the further method step according to FIG. 1f, the transfer device 6 is moved in the direction of the hollow mold spaces 2 for injection molding the second component for the final manufacture of the toothbrush body 4. After moving the transfer device 6 (in the drawing) upwardly, the transfer device 6 is lowered again so that the injection molding blanks 3 are positioned in the corresponding hollow mold spaces 2 of this second station. In this connection, the transfer device 6 delimits the hollow mold spaces 2 in the area of the head 5 of the injection-molded blanks 3.

Figure 1H:
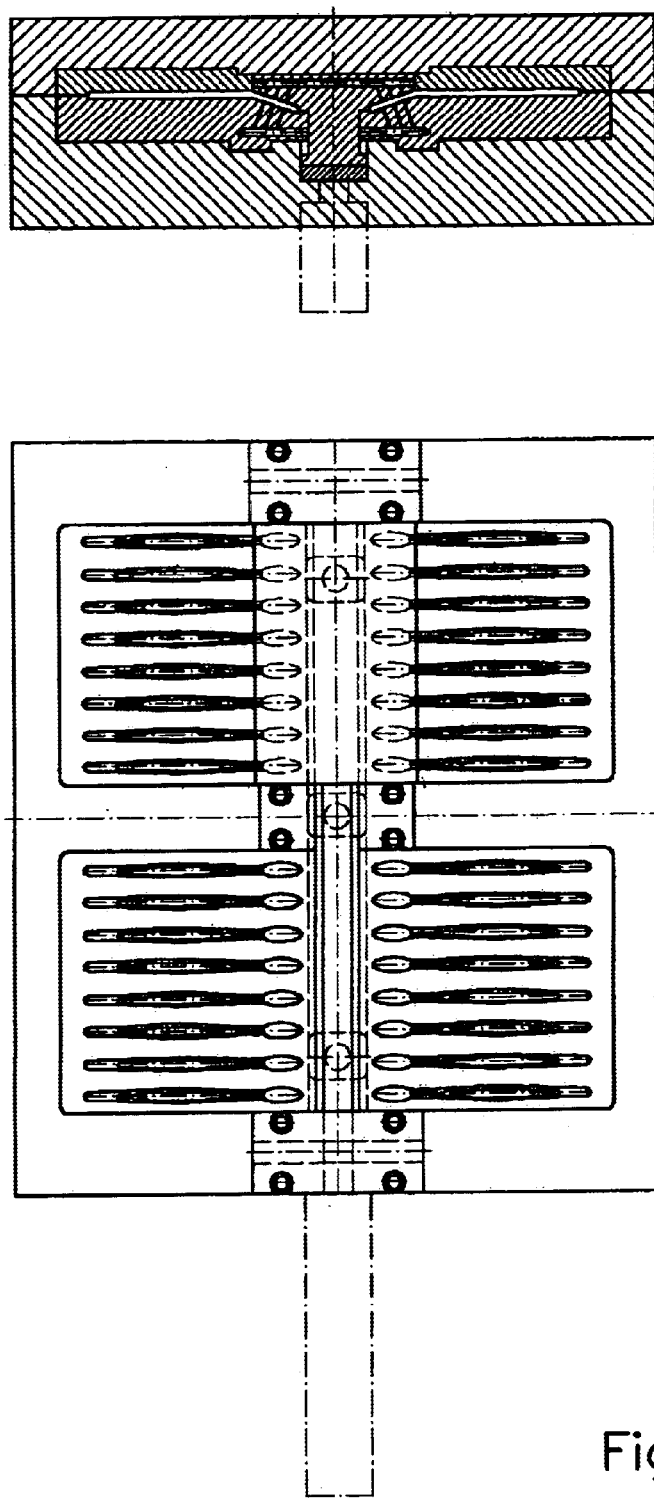

Finally, in FIG. 1h it is illustrated that the tool with its two tool halves 1, 1' are closed. In this way, in the first station new injection-molded blanks 3 are injection molded, and in the second station the second component is injection-molded for producing the finished toothbrush body 4. In this connection, the second component is injection molded in the area of the grip of the toothbrush body 4 while in the area of the head 5 no further component is provided. Accordingly, the cycle is finished and can be started over again.

The second embodiment variant of FIGS. 2a to 2h shows a tool which in regard to its basic configuration and basic concept is similar to the tool of the first variant of FIGS. 1a to 1h. The difference is that the hollow mold spaces 2 are oriented in the longitudinal direction of the movement direction of the transfer device 6. Accordingly, the transfer device 6 is formed as a bridge extending transversely to its movement direction and being moveable at its ends by means of L-shaped guides 7 into the tool half 1.

Figure 2A:
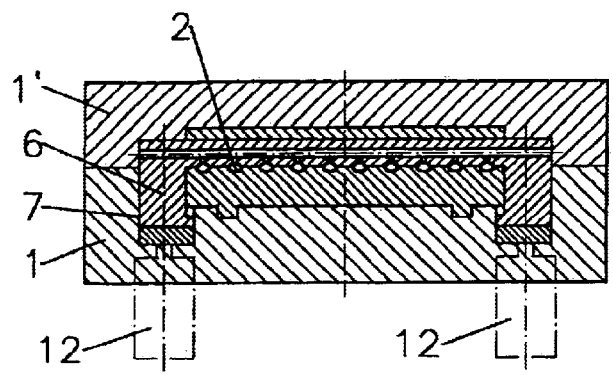
Figure 2A:
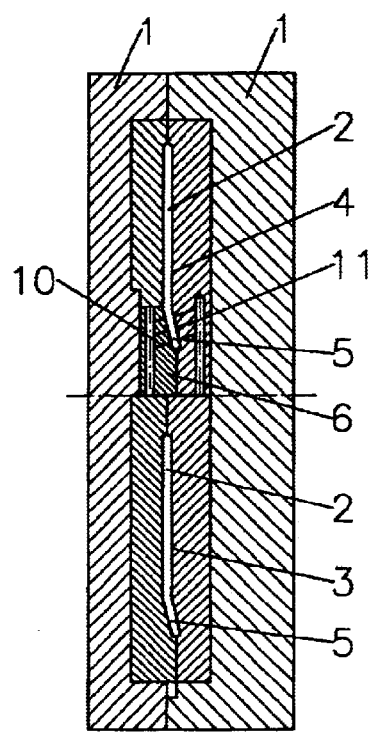
Figure 2A:
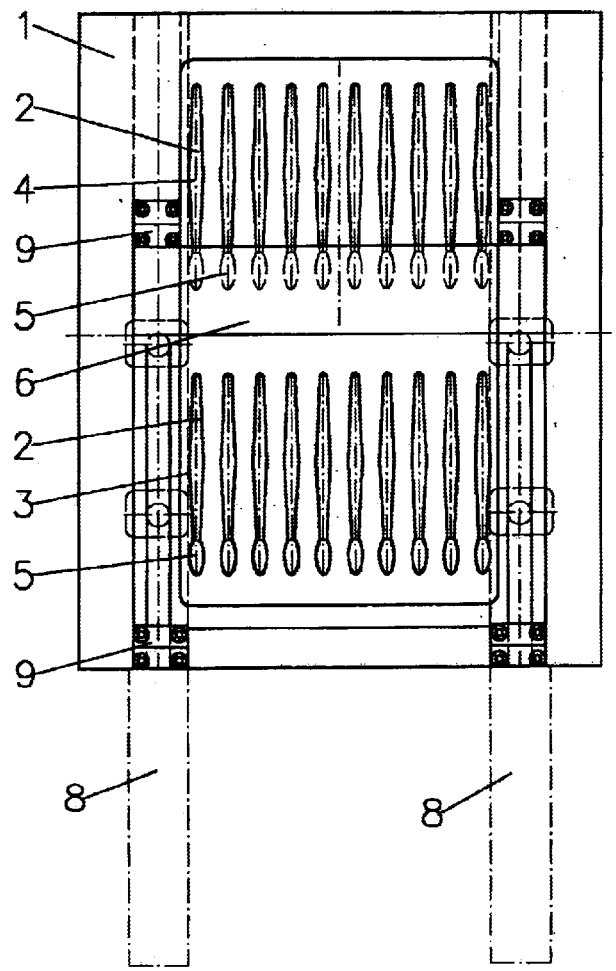
Figure 2B:
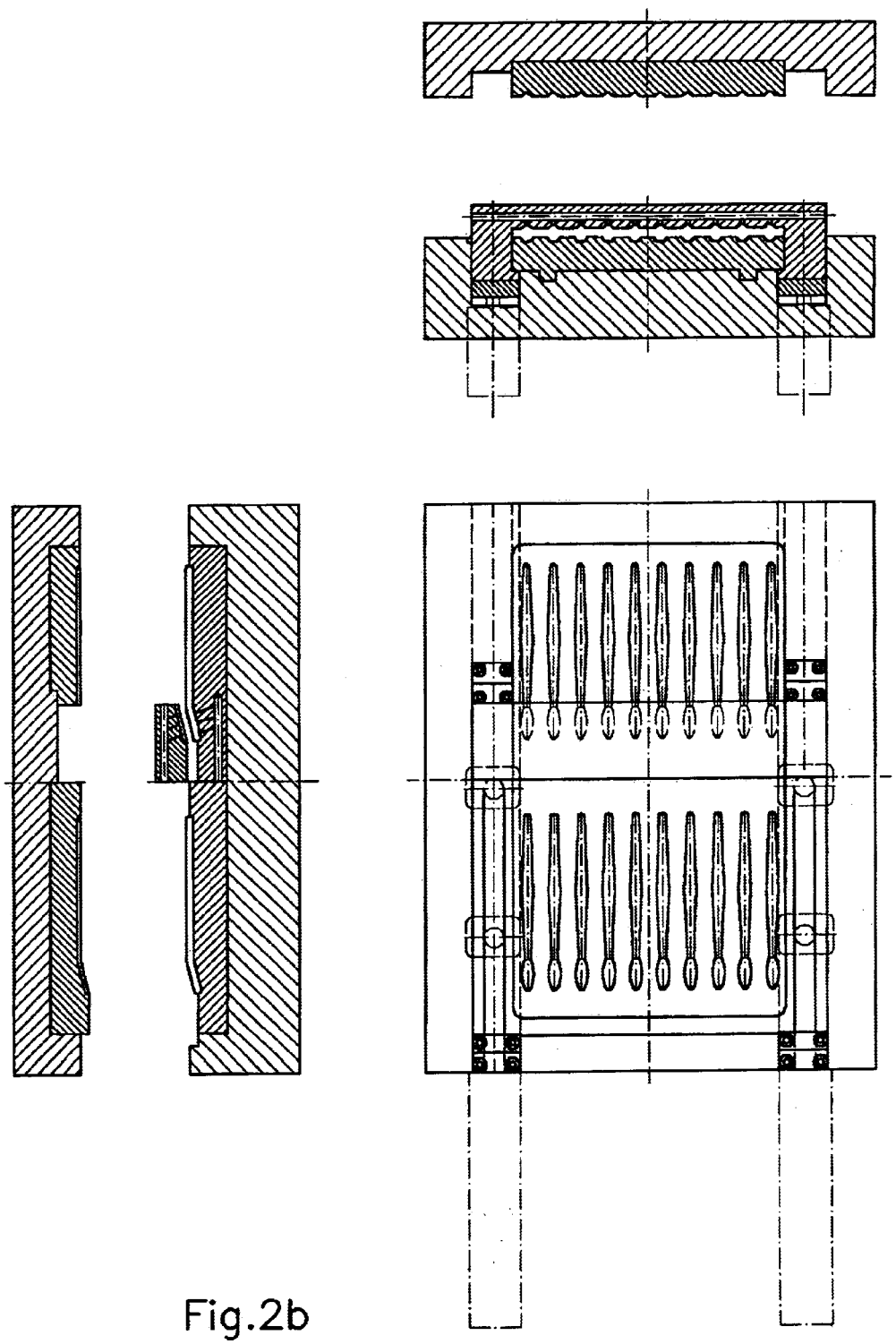
Figure 2C:
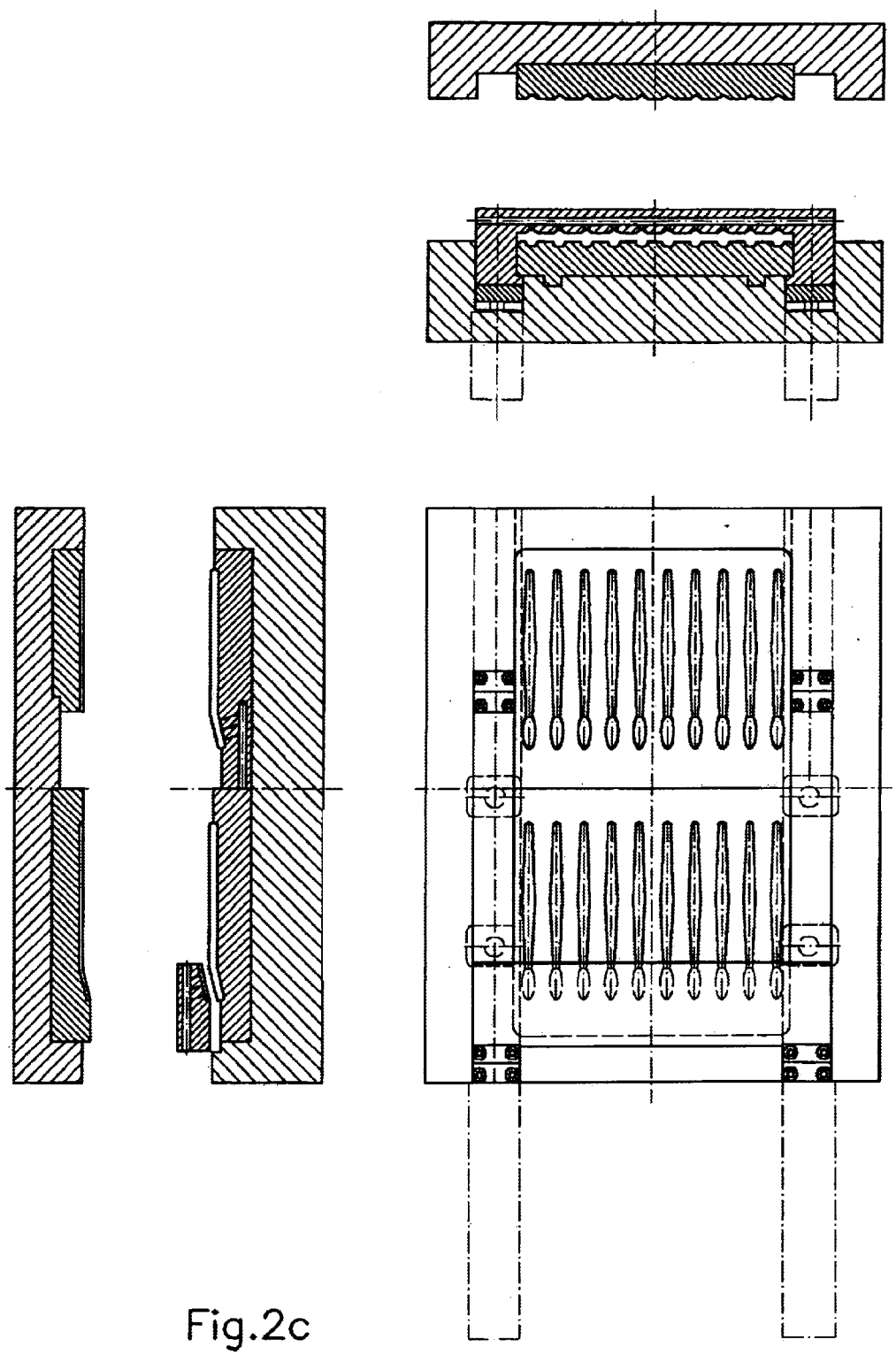
Figure 2D:
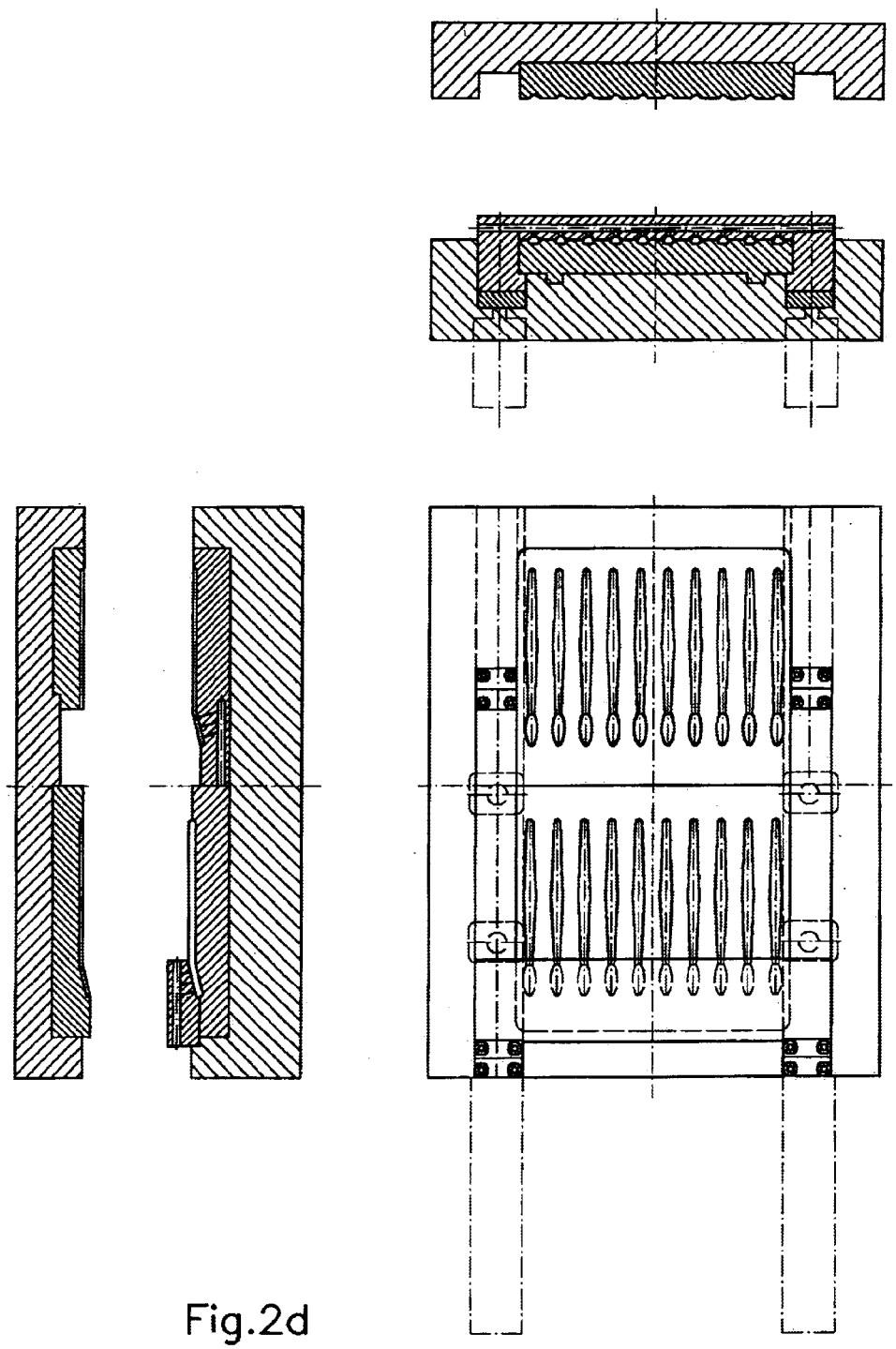
Figure 2E:
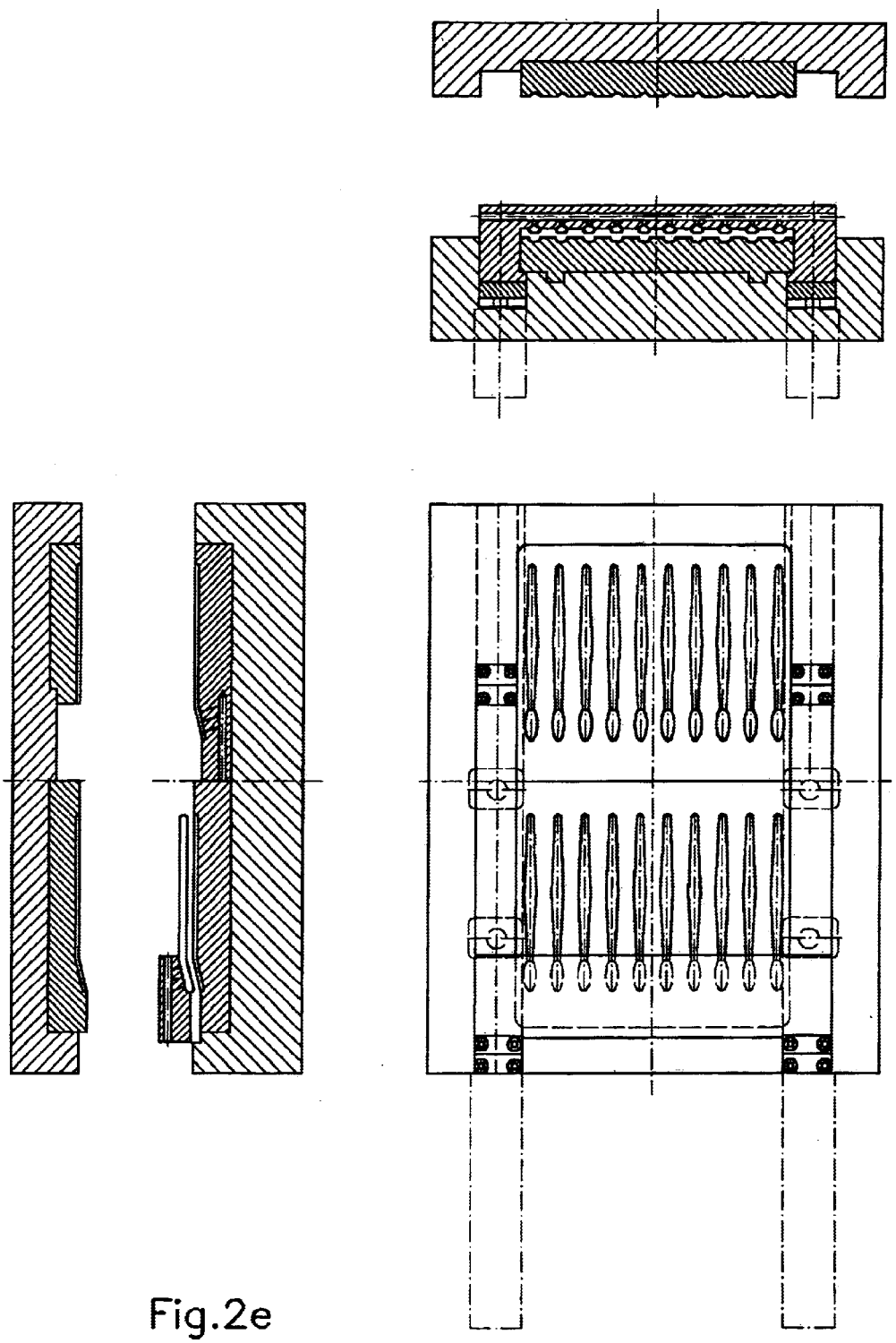
Figure 2F:
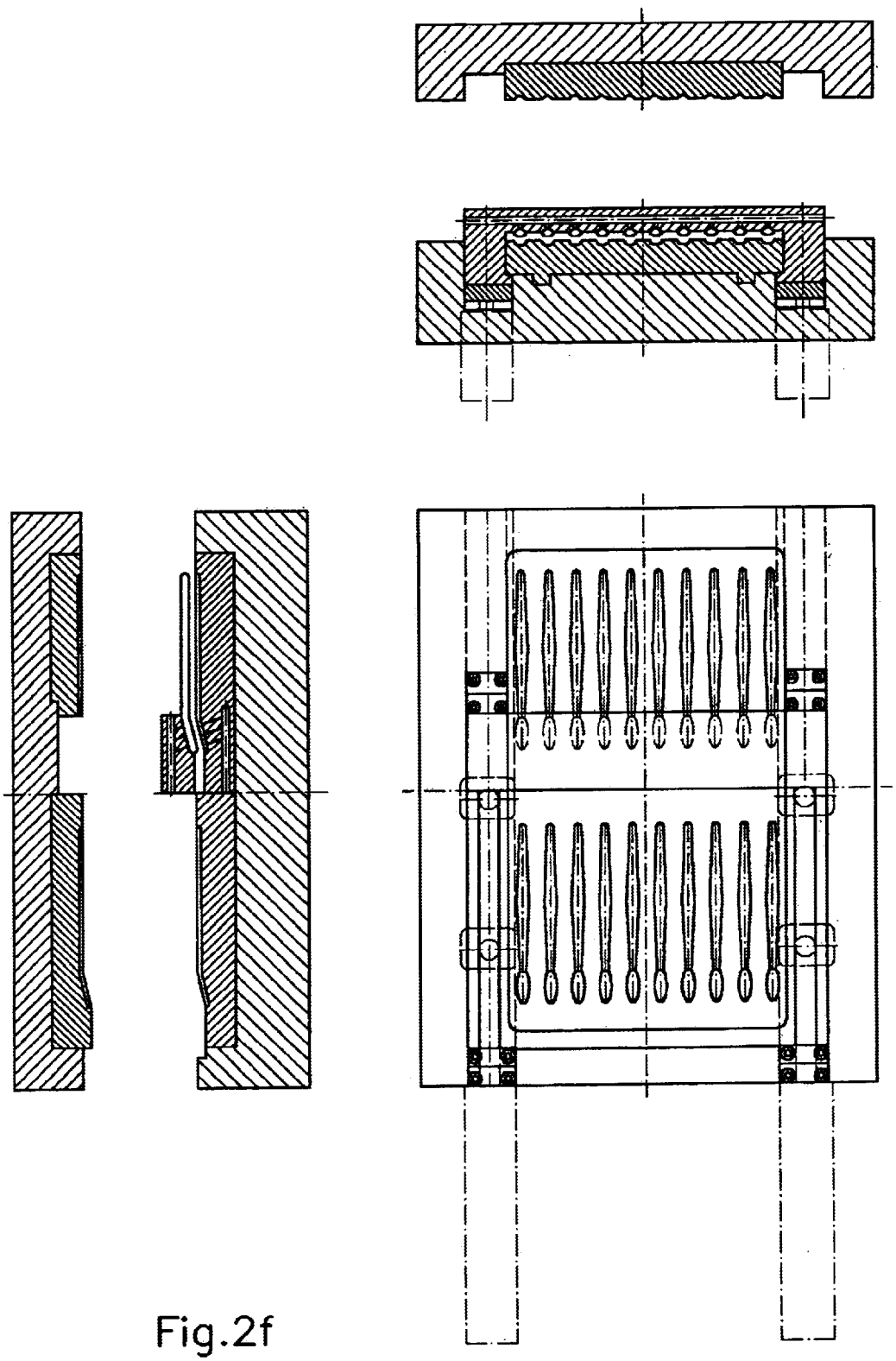
Figure 2G:
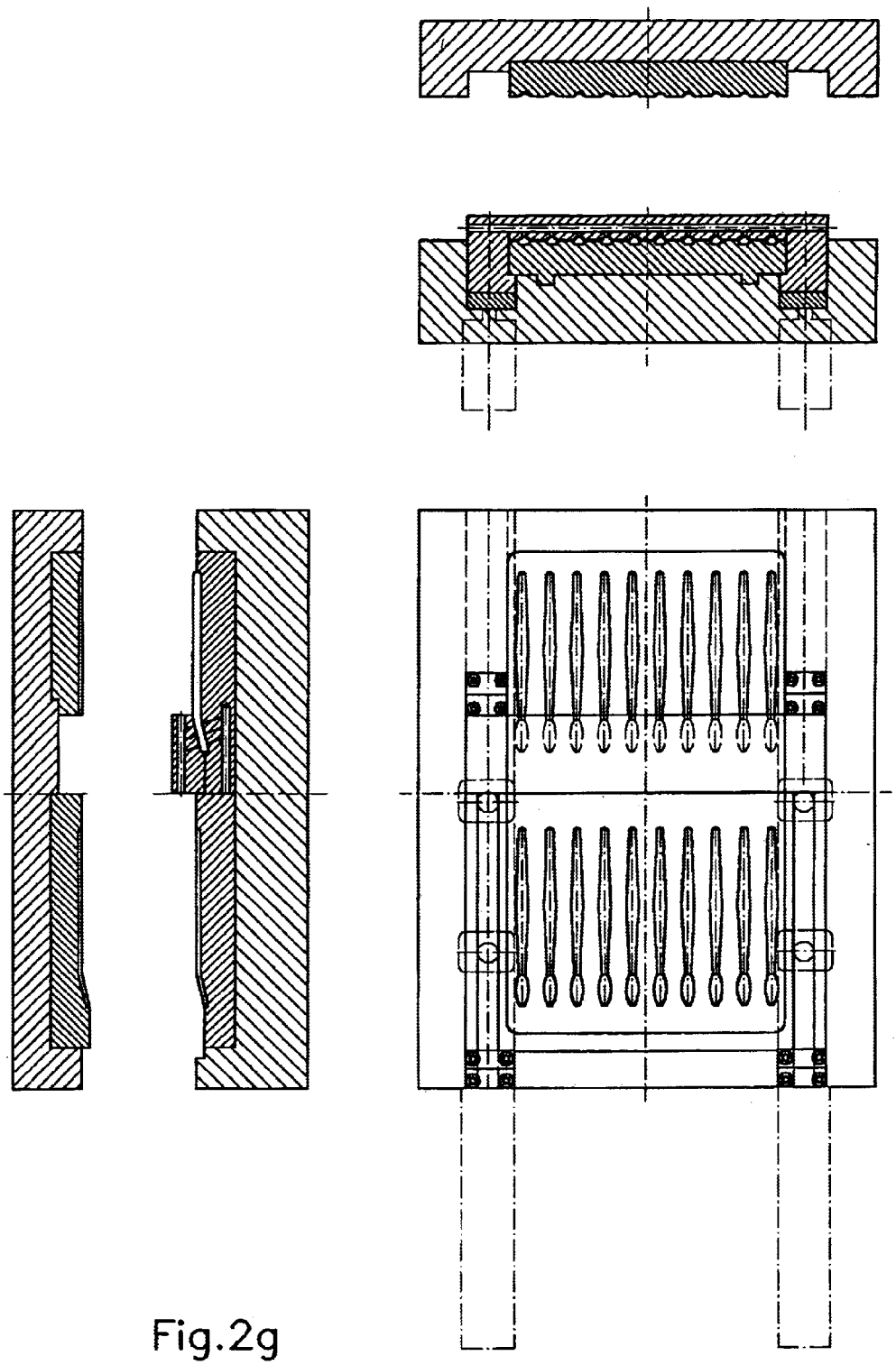
Figure 2H:
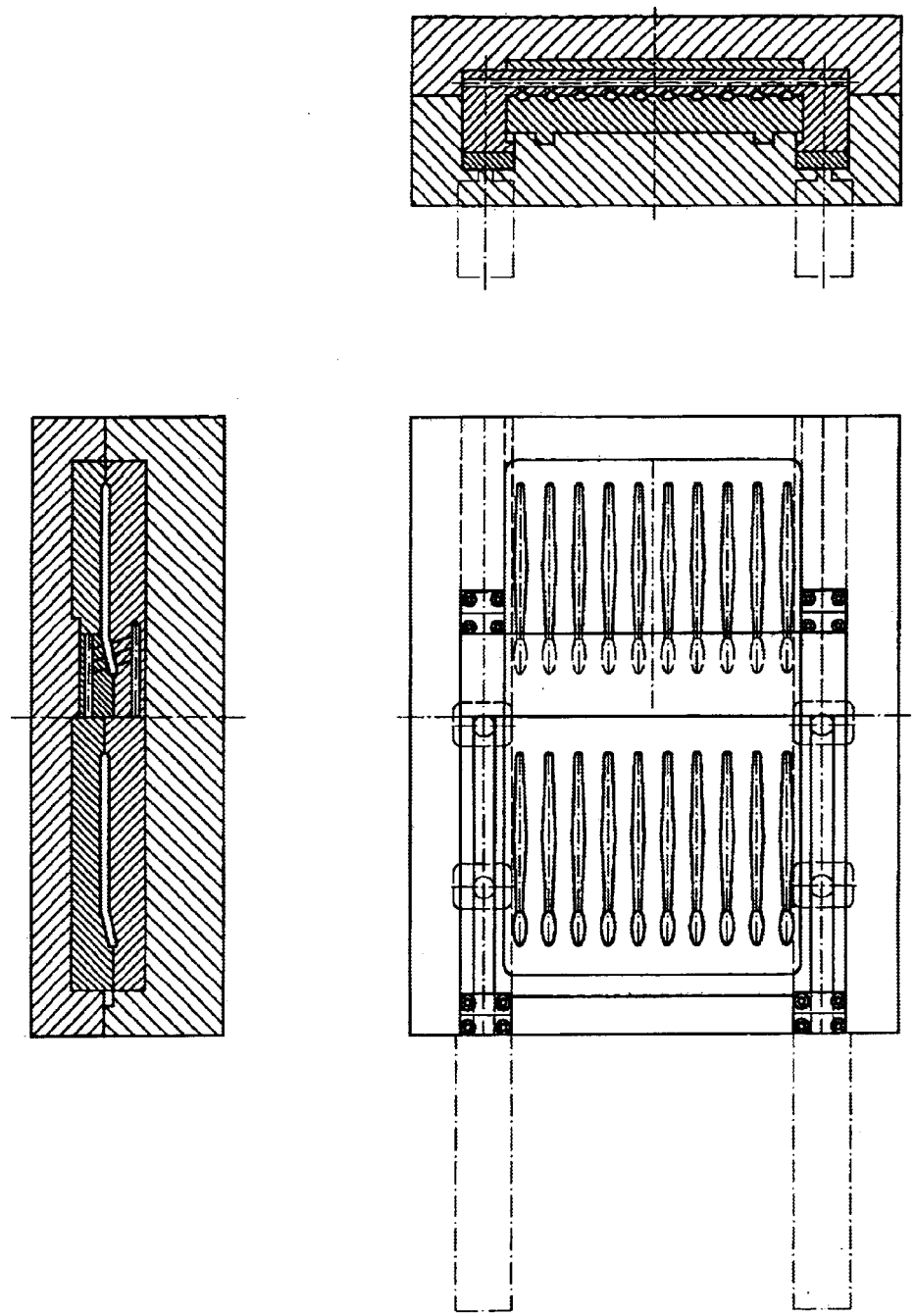

This tool operates with regard to the course of the process in the same way as the tool of the above described first variant wherein the method steps illustrated in FIGS. 2a to 2h of the drawings correspond to the method steps of FIGS. 1a to 1h. The basic principle resides in that after injection molding of the injection-molded blank 3 the transversely extending transfer device 6 is moved to these injection-molded blanks 3 (FIGS. 2a to 2e) in order to subsequently transfer them into the second station for injection-molding the second component (FIGS. 2f to 2h).

| List of Reference Numerals | |
| --- | --- |
| 1, 1' | tool half |
| 2 | hollow mold space |
| 3 | injection-molded blank |
| 4 | toothbrush body |
| 5 | head |
| 6 | transfer device |
| 7 | guide |
| 8 | pneumatic cylinder |
| 9 | stop |
| 10 | vacuum suction cup |
| 11 | vacuum suction cup |
| 12 | pneumatic short-stroke cylinder |

What is claimed is:

1. A tool for multi-component injection molding of plastic toothbrush bodies (4) for toothbrushes, the tool comprising:
    two tool halves (1, 1') forming hollow mold spaces (2) and configured to move apart into an open position and to move together into a closed position;
    wherein the hollow mold spaces (2) comprise first cavities for injection molding first components of the toothbrush body (4) and second cavities for forming second components of the toothbrush body (4), wherein the first cavities are delimited exclusively by the two tool halves (1, 1');
    a transfer device (6) integrated into a first one of the two tool halves (1) and immersible into the first tool half (1);
    wherein the transfer device (6) is configured to transfer injection-molded blanks (3) formed in the first cavities into the second cavities for injection molding the second components;
    wherein the transfer device (6) in the closed position of the two tool halves (1, 1') is located outside of the first cavities;
    wherein the transfer device (6) is configured to move, after injection molding of the first components, into the first cavities of the injection-molded blanks (3), to pick up the injection-molded blanks (3), and subsequently transport the injection-molded blanks into the second cavities for injection-molding the second components.

2. The tool according to claim 1, wherein the transfer device (6) is linearly moveable.

3. The tool according to claim 1, further comprising a T-shaped guide or an L-shaped guide (7) arranged in the first tool half (1), wherein the transfer device (6) is moveable on the T-shaped guide or the L-shaped guide (7) within the first tool half (1).

4. The tool according to claim 1, wherein the transfer device (6) is liftable off the first tool half (1).

5. The tool according to claim 1, wherein the transfer device (6) engages the injection-molded blanks (3) on a side opposite the first tool half (1).

6. The tool according to claim 1, wherein the transfer device (6) picks up the injection-molded blanks (3) by a head (5) or a neck or a grip of the injection-molded blanks (43).

7. The tool according to claim 1, wherein the transfer device (6) has vacuum suction cups (11) for picking up the injection-molded blanks (3).

8. The tool according to claim 1, wherein the transfer device (6) delimits the second cavities for the second components.

9. The tool according to claim 1, wherein the first tool half (1) in the area for injection molding the second components has vacuum suction cups (10) for picking up the toothbrush body (4).

10. The tool according to claim 1, wherein the injection-molded toothbrush body (4) is arranged in the tool transversely to a moving direction along a movement path of the transfer device (6).

11. The tool according to claim 10, wherein on both sides of the movement path of the transfer device (6) transversely extending toothbrush bodies (4) are arranged.

12. The tool according to claim 1, wherein the injection molded toothbrush body (4) is oriented parallel to a movement direct) on of the transfer device (6).

13. The tool according to claim 1, wherein the hollow spaces (2) comprises additional cavities for injection molding additional components and wherein the transfer device (6) is configured to service the additional cavities.

* * * * *